Oct. 24, 1950  F. MARBURY, JR  2,527,019
TOOL SPACING DEVICE
Filed June 11, 1948  2 Sheets-Sheet 2
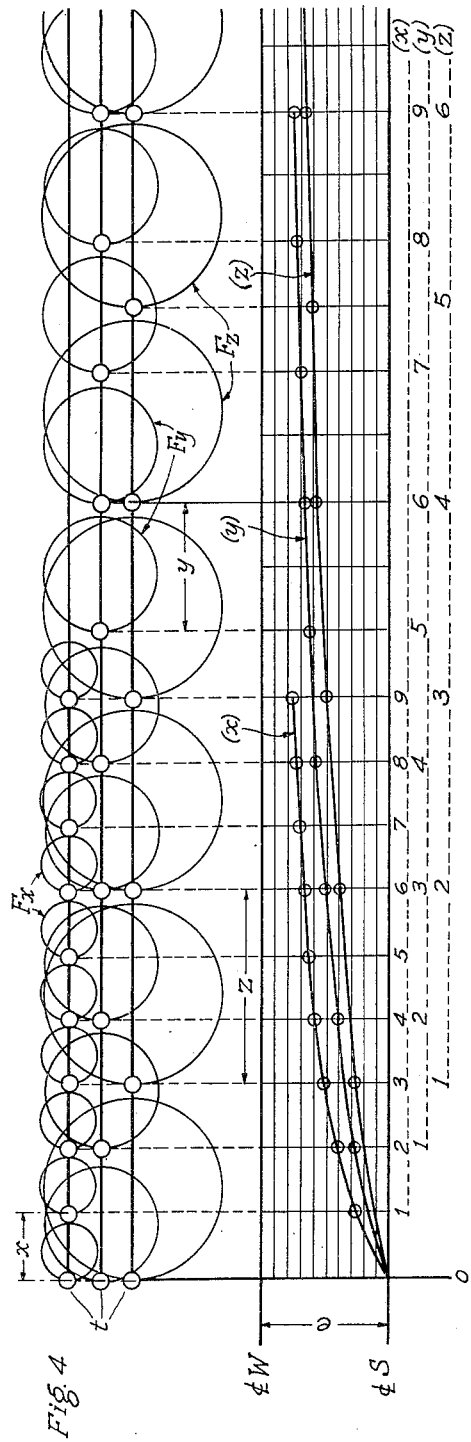
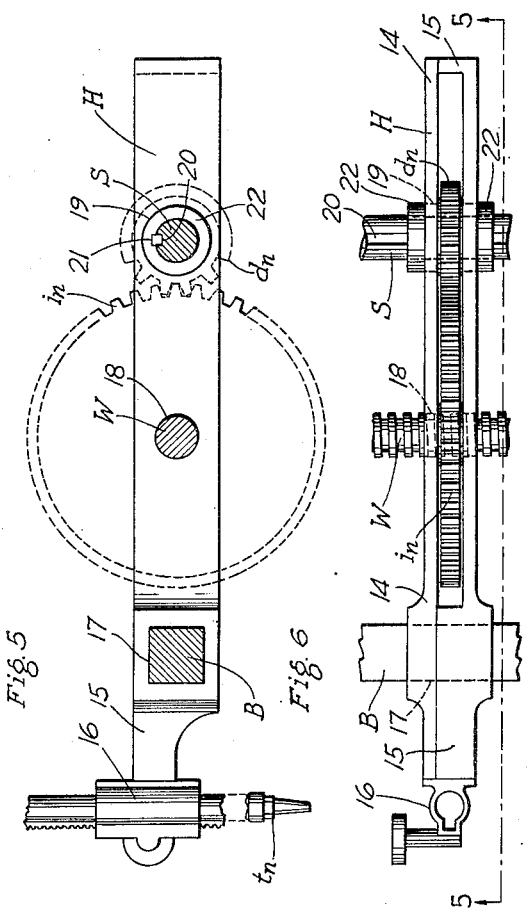
INVENTOR.
Fendall Marbury Jr.
BY
ATTORNEYS Patented Oct. 24, 1950

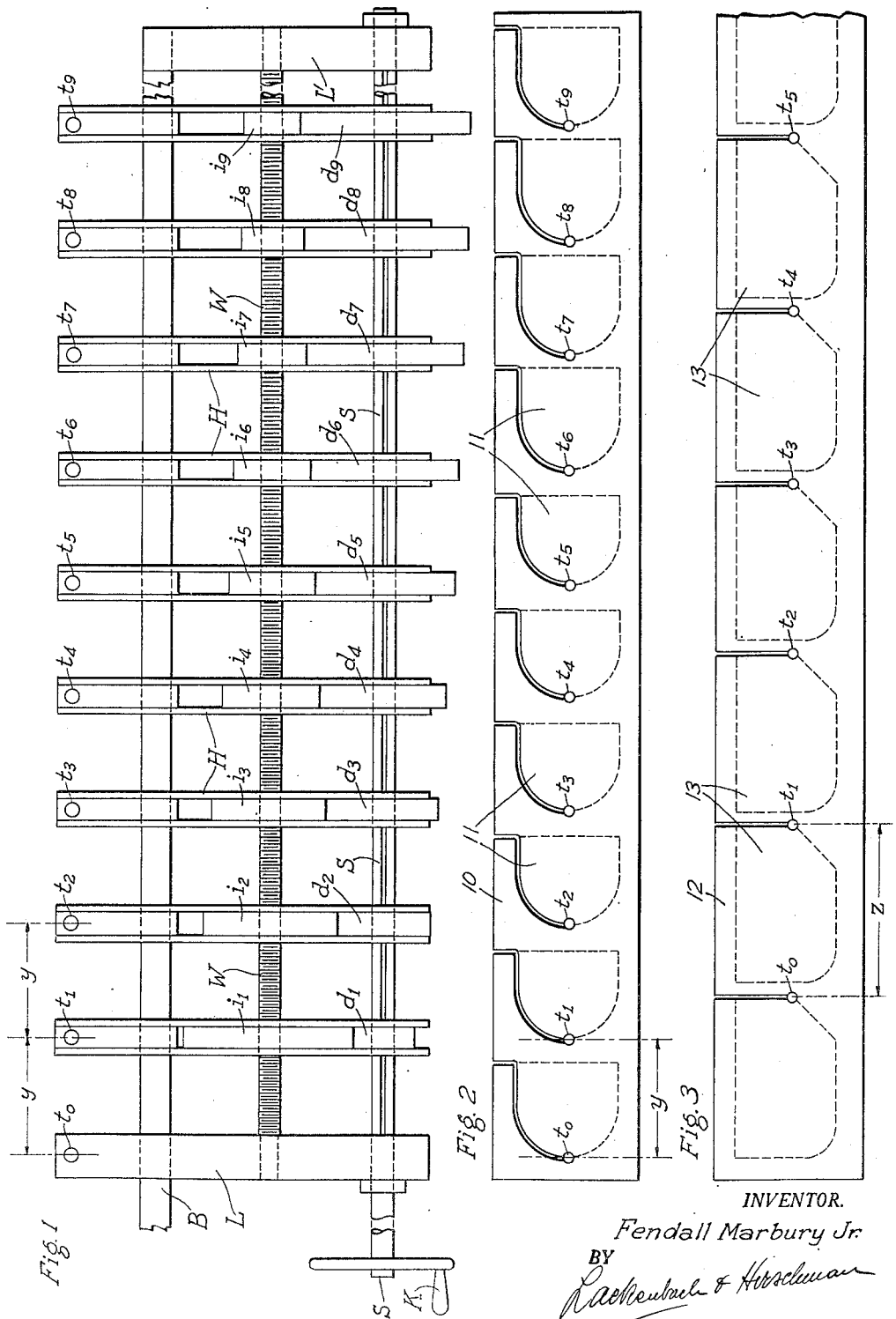

2,527,019

UNITED STATES PATENT OFFICE 2,527,019

TOOL SPACING DEVICE

Fendall Marbury, Jr., Baltimore, Md.

Application June 11, 1948, Serial No. 32,326

6 Claims. (Cl. 266—23)

The present invention relates to apparatus for spacing tool holders, and, in particular, to pantographic apparatus used in gas cutting metal plates.

The invention has particular reference to pantographic apparatus used in guiding a beam carrying a plurality of spaced torches for the purpose of cutting simultaneously a plurality of identical figures from a plate of metal.

The invention is particularly useful in connection with a pantographic machine of the type shown on page 282 of, and described in, "Metalwork Technology and Processes," by Oswald A. Ludwig, published by McKnight & McKnight, Bloomington, Ill., 1943.

This machine comprises a tracing element for tracing a templet, a plurality of spaced cutting torches mounted on a horizontal beam above a work table, and pantographic means connecting the tracing element and said beam whereby the several torches are simultaneously caused to track above the work in reproduction of the path of said tracing element.

Machinery of the type mentioned above is well known in the gas cutting art, and herein no detailed description is deemed necessary.

The present invention is concerned principally with means whereby the operator, at or near the tracing element, may space the torches upon the beam at predetermined equal intervals without manually setting each torch individually as is now the practice. Heretofore in machinery of the type mentioned, each of the several torches is individually clamped onto the beam. When desired to vary the interval of spacing of the torches, each must be unclamped and then locked again upon the beam at a new position. It will be understood, of course, that the torches are desired almost invariably to be spaced each from the next by a common interval as the work of each is to cut a common figure from a slab or plate of metal, each such figure being as close to the next as is practicable for the purpose of minimizing waste.

The main object of the present invention is to provide the operator of such pantographic apparatus with means for setting all torches at once, said means being conveniently operable manually near the tracing element so that the operator may change the torch spacement at will without going from the templet table to the work table.

It will be understood from the following description that the invention is useful in various applications where the spacing of tool holders at equal intervals by a common control is desirable; and that the invention is not limited to pantographic apparatus for guiding a plurality of gas cutting torches. However, for the purposes of the following description, the application of the invention to gas cutting pantographic apparatus of the class mentioned above is adopted.

The invention, in its application to gas cutting pantographic apparatus, contemplates means available at or near the tracing element and table whereby the tracer may readily effect equal spacing of the torch holders without unclamping each torch and holder and repositioning the same with respect to a prior setting. In such pantographic apparatus, the beam carrying the torch holders is usually horizontally disposed; and the torch holders are individually removable and adjustable. The present invention provides the operator with convenient means whereby he can change the setting of a plurality of torches simultaneously merely by turning a crank.

In the drawing:

Fig. 1 is a conventionalized plan view of an embodiment of the invention in connection with the beam of a gas cutting pantographic apparatus, showing a plurality of torch holders slidably mounted on said beam;

Figs. 2 and 3 are plan views of slabs or sheets of metal from which a plurality of figures are in process of being gas cut, that portion of each cut already made being shown in solid lines and the prospective paths of the several torches being indicated by dotted lines, and the torches themselves by small circles;

Fig. 4 is an analytical chart illustrative of the invention, and is more particularly described below;

Fig. 5 is an elevational view of one exemplary torch holder and means for moving the same (and is a vertical section on the line 5—5 of Fig. 6); and Fig. 6 is a fragmentary plan view of said torch holder and said means.

The beam of the pantographic apparatus on which torches are commonly mounted is often of square cross section. Such a beam is seen in plan in Fig. 1 and in cross section in Fig. 5, and is designated B. The practice heretofore has been, of course, to mount the several torches, each individually, at equal selected intervals on the beam. Usually the torch itself is mounted vertically in a holder which is itself clamped to the beam, the holder being provided with means for vertically adjusting the torch. See Figs. 5 and 6, wherein the holder shown is provided with similar means.

At a convenient position on the beam B near the templet table (not shown) is rigidly mounted a cross beam L; and at or near that end of the beam farthest from the templet table (i. e., to the right, in Fig. 1) is rigidly mounted a cantilever L', disposed parallel to the cross beam. The cross beam L and the cantilever L' are disposed normal to beam B as shown in Fig. 1, and the beam B together with the cross beam L and the cantilever L' form a rigid frame. Fig. 1 is erased through near the right hand edge of the figure to indicate that the length of the frame may be of any desired length that is not inconsistent with the general structure of the pantographic apparatus of which the beam B is a part.

Journaled in the cross beam L and in the cantilever L' is a shaft S disposed parallel to beam B. The shaft S is shown to be extended beyond the cross beam to the left and to be partly erased. The left end of the shaft S in Fig. 1 is presumed to be convenient to the templet table and is provided with a crank K whereby the operator may manually rotate the shaft without leaving the templet.

Extending between the cross beam L and the cantilever L' between and parallel to beam B and shaft S is a screw W, mounted so as to be locked against rotary movement.

In Fig. 1, between the cross beam L and the cantilever L' nine torch holders H, H, are indicated. The design of a torch holder suitable for use in an application of the present invention connected with a gas cutting pantographic machine is not limited to the illustrated structures; however a design is suggested in Figs. 5 and 6, both of which are enlarged with respect to Fig. 1. The structure shown in Figs. 5 and 6, which may be that of any torch holder H, is subsequently described in greater detail; however, with reference to Fig. 1, it is sufficient to observe that any torch holder H is a beam disposed normally to beam B and slidably mounted thereon, and also bored at two centers whereby the screw W and the shaft S may pass freely through the holder.

At one end of the cross beam L is mounted a torch, indicated as a small circle; such torch cannot move relative to beam B. At the corresponding end of each torch holder H is mounted another torch. All torches are similarly indicated as small circles and are commonly aligned. Each torch is designated $t$; the torches, of which there are ten shown, altogether, are subindexed ordinally, that torch mounted on cross beam L being designated $t_0$, that mounted on the holder H nearest the cross beam, $t_1$, etc.; the last, or tenth torch—which is the ninth movable torch—being designated $t_9$.

In Fig. 1 all torches are shown to be spaced according to a common interval $y$. Fig. 2 is a plan view of, say, a slab of metal 10 from which a plurality (here, ten) of like figures 11 are in process of being gas cut by the torches $t$ spaced according to interval $y$. A like part of each cut is shown in solid lines to have been completed: like prospective paths of the several torches are indicated by dotted lines. This illustration of the work performed by a gas cutting pantographic machine, in connection with Fig. 3, which shows partly and in plan another slab 12 from which a plurality of like figures 13 are in process of being cut by the torches $t$ spaced according to a greater interval $z$, clearly shows the function for which the invention is intended. Heretofore, in switching from an operation such as illustrated in Fig. 2 to another such as illustrated in Fig. 3, it has been necessary to unclamp each torch holder and move all torches to effect the change from, e. g., an interval $y$, to, e. g., an interval $z$; and then to reclamp the several torch holders in the new positions. The present invention enables the tracer to change from one interval to another merely by turning the crank K.

A suitable design for a torch holder H is shown in Figs. 5 and 6. Here the holder H is shown to be made of two parts 14 and 15 secured together in any suitable way to form a single beam. At the forward end of the holder H is mounted any suitable device 16 for regulating the vertical disposition of any torch $t_n$. Near the forward end of the holder H a square slot 17 is provided whereby the holder may be slidably mounted on the square beam B. The holder is bored at 18 to accommodate the screw W and at 19 to accommodate the shaft S. The two parts 14 and 15 of the holder H are formed, as shown in Fig. 6, so that when secured together, a long vertical slot is provided through the holder, as best illustrated in Fig. 6.

The shaft S is provided with a keyway 20 extending from end to end. Slidably mounted on shaft S within the vertical slot of the holder H is a gear $d$ being provided with a key 21 engaging the keyway 20 and so preventing rotary movement of the gear relative to the shaft. The gear is also provided with hubs 22, 22 freely passing through the bore 19 of the holder H.

Another gear $i$, centrally tapped, is mounted upon screw W also within the vertical slot of the holder H and meshes with gear $d$. It will be understood from the foregoing that gear $i$ is a nut threaded on screw W.

The holder shown in Figs. 5 and 6 may represent any holder of a series, and the gears are accordingly designated $d_n$ and $i_n$. However, if the holder shown in Figs. 5 and 6 is taken as representing the first holder H next the cross beam L of Fig. 1, the gear mounted on shaft S is that designated $d_1$ in the lastnamed figure, and the gear mounted on screw W is that designated $i_1$ in that figure. Now, with further reference to Fig. 1, the driver gears, i. e., those mounted on the shaft S, and the idler gears, i. e., those mounted on the screw W, are subindexed to accord with the torches; and, for convenience herein, the holder H carrying torch $t_1$ is referred to as the first holder (the cross beam, while operating as a holder, being fixed in relationship to the beam B, is invariably referred to as a cross beam to distinguish it from the movable holders), the holder H carrying torch $t_2$ as the second holder, etc.

Fig. 4 is a chart showing at its upper part three horizontal lines each representative of the alignment of the torches with respect to beam B; however, for clarity, three separate lines are shown as the chart illustrates spacements of the torches (all shown as small circles) according to three separate intervals $x$, $y$, and $z$, the first half as great as the second and one third as great as the third. On the upper line the torches are indicated as spaced according to interval $x$, and circles $F_x$ indicate the distribution of elementary figures proposed to be gas cut with the torches at this spacement. On the middle and lower of the upper three horizontal lines the torches are respectively indicated as spaced according to intervals $y$ and $z$, circles $F_y$ and $F_z$ indicating the distributions of elementary figures proposed to be cut at these latter intervals.

In the lower part of the chart the heavy horizontal lines indicate the centerlines of the screw W and of the shaft S. The distance between is designated $e$. The dimension $e$ is divided here into tenths at all stations of position shown by means of light horizontal lines. A number of stations of position longitudinal with respect to the screw W, shaft S, and beam B (this latter not indicated), in multiples of interval $x$ are indicated in the chart by vertical lines, forming, with the horizontal lines in the lower part of the chart, a grid for a graph presently to be described. Where a spaced torch appears at such a station of position the vertical line is continued upward to the torch symbol.

The numbers 1 to 9, inclusive, on the dotted line beneath the grid which is indexed $(x)$ of course indicate the ordinal numbers of the torches shown spaced above at interval $x$; and, so, the numbers on the dotted line indexed $(y)$ and those on the dotted line indexed $(z)$ indicate respectively the ordinal numbers of the torches shown spaced above at intervals $y$ and $z$. Station of position 0 designates that of the torch carried on the cross beam L. The curves on the graph—each curve being part of an equilateral hyperbola—indexed $(x)$, $(y)$, and $(z)$, pass through points (ringed) on the several station of position lines which determine the pitch radii of gears $d$ and $i$ relating to the several holders H and correspond to the three selected intervals of spacement.

As crank K is turned, so rotating shaft S, all gears $d$, of course, are rotated at a common rate. In order, therefore, that each gear $i$ may be accordingly rotated at a rate different from that of any other gear $i$, so that the gears $i$ travel progressively faster on screw W from first to last, so carrying their related holders longitudinally with respect to beam B progressively faster from first to last, the ratio between each pair of gears $d$ and $i$ must progressively change.

For example, let it be assumed that the torches are spaced at interval $x$, and it is desired to change the spacement to interval $y$, equal to $2x$. (See the chart in Fig. 4.)

At the start torch $t_1$ is distant $x$ from fixed torch $t_0$. Torch $t_1$ must move from its original position a distance equal to $x$ in order to come to rest $2x$ or $y$ from torch $t_0$. At the start torch $t_2$ is distant $2x$ or $y$ from fixed torch $t_0$. Torch $t_2$ must move from its original position a distance equal to $2x$ or $y$ in order to come to rest $4x$ or $2y$ from torch $t_0$. So torches $t_3$, $t_4$, $t_5$, $t_6$, $t_7$, $t_8$, and $t_9$ must move from original positions of $3x$, $4x$, $5x$, $6x$, $7x$, $8x$, and $9x$, respectively, from torch $t_0$ to new positions farther away by exactly the measure of the original distances. In other words, every movable torch must move a distance equal to the product of $x$ multiplied by the ordinal number of the torch.

Thus gears $i_1$, $i_2$, $i_3$, $i_4$, $i_5$, $i_6$, $i_7$, $i_8$, and $i_9$, respectively, must turn at different rates having the arithmetical relationship of the ordinal number of the movable torches.

Hence the ratio of the first driver gear $d_1$ to the first idler gear $i_1$ being adopted as a standard, the ratios of the other driver-idler pairs are necessarily the standard ratio multiplied by the ordinal number of the pair. In the structure shown a ratio of 1/3 may be taken as that of the first pair—the driver $d_1$ having a pitch radius of 1 and the idler $i_1$ a pitch radius of 3. Thus: the second ratio is 2/3, the third is 3/3, and so on; and the ninth is 9/3, or, reduced, 3/1 (according with the particular structure shown, wherein the first ratio, for convenience, was selected as the reverse of the last). In the structure shown the ratios are obviously 1:3, 2:3, 3:3, 4:3, 5:3, 6:3, 7:3, 8:3, and 9:3 (still assuming the 1:3 first ratio suggested above). The number of torches is immaterial.

I claim:

1. In apparatus of the class described, a shaft; means for rotating said shaft; a screw disposed parallel to said shaft; a series of pairs of intermeshing gears, one gear of each pair being a driver slidably mounted on and keyed to said shaft and the other gear of each pair being a nut threaded on said screw so as to travel axially thereon in response to rotation of said shaft, the ratio of any driver to its related other gear being the ratio of the first driver to its related other gear multiplied by the ordinal number of the pair; and means maintaining the gears of each pair invariably in a common plane.

2. The combination of claim 1 wherein said means maintaining the gears of each pair invariably in a common plane are adapted to carry tools, one tool thereof being carried in the common plane of the gears of each pair.

3. In apparatus of the class described, a shaft; means for rotating said shaft; a screw disposed parallel to said shaft; a series of pairs of intermeshing gears, one gear of each pair being a driver slidably mounted on and keyed to said shaft and the other gear of each pair being a nut threaded on said screw so as to travel axially thereon in response to rotation of said shaft, the ratio of any driver to its related other gear being the ratio of the first driver to its related other gear multiplied by the ordinal number of the pair; and means maintaining the gears of each pair invariably in a common plane, said means comprising a plurality of frames each laterally confining the gears of a pair and being slidably mounted on said shaft so as to be freely movable axially thereon and along said screw.

4. The combination of claim 3 wherein said means maintaining the gears of each pair invariably in a common plane are provided with tool holders with one tool holder for each such frame.

5. The combination of claim 3 wherein each frame is provided with a holder adapted to support a gas cutting torch in the plane of the gears of the pair relating to that frame.

6. In combination with the tool carrying beam of a pantograph for tracking a plurality of tools in like patterns over a work surface, a shaft mounted parallel to said beam and fixed with relationship thereto; means for rotating said shaft; a screw mounted parallel to said beam and fixed with relationship thereto; a series of pairs of intermeshing gears, one gear of each pair being a driver slidably mounted on and keyed to said shaft and the other gear of each pair being a nut threaded on said screw so as to travel axially thereon in response to rotation of said shaft, the ratio of any driver to its related other gear being the ratio of the first driver to its related other gear multiplied by the ordinal number of the pair; and means maintaining the gears of each pair invariably in a common plane, said means comprising a plurality of frames each laterally confining the gears of a pair in a common plane, said frames being slidably mounted on said shaft and on said beam, and each such frame being provided with a tool holder adapted to maintain a tool in said common plane.

FENDALL MARBURY, Jr.

(References on following page)

REFERENCES CITED

The following references are of record in the file of this patent:

UNITED STATES PATENTS

| Number | Name | Date |
|---|---|---|
| 287,415 | Madison | Oct. 23, 1883 |
| 1,768,828 | Carter | July 1, 1930 |
| 2,441,474 | Deitrich | May 11, 1948 |

FOREIGN PATENTS

| Number | Country | Date |
|---|---|---|
| 24,165 of 1892 | Great Britain | Nov. 18, 1893 |